United States Patent
Duerig et al.

(10) Patent No.: US 9,454,600 B2
(45) Date of Patent: Sep. 27, 2016

(54) REFINING IMAGE RELEVANCE MODELS

(75) Inventors: Thomas J. Duerig, Sunnyvale, CA (US); Jason E. Weston, New York, NY (US); Charles J. Rosenberg, Cupertino, CA (US); Kunlong Gu, Belmont, CA (US); Samy Bengio, Mountain View, CA (US)

(73) Assignee: Google Inc., Mountain View, CA (US)

( * ) Notice: Subject to any disclaimer, the term of this patent is extended or adjusted under 35 U.S.C. 154(b) by 779 days.

(21) Appl. No.: 13/363,979

(22) Filed: Feb. 1, 2012

(65) Prior Publication Data

US 2015/0169999 A1     Jun. 18, 2015

Related U.S. Application Data

(60) Provisional application No. 61/541,543, filed on Sep. 30, 2011.

(51) Int. Cl.
| | |
|---|---|
| *G06K 9/62* | (2006.01) |
| *G06K 9/52* | (2006.01) |
| *G06F 17/30* | (2006.01) |
| *G06K 9/66* | (2006.01) |

(52) U.S. Cl.
CPC ..... *G06F 17/30675* (2013.01); *G06F 17/3028* (2013.01); *G06K 9/52* (2013.01); *G06K 9/6202* (2013.01); *G06K 9/6256* (2013.01); *G06K 9/6262* (2013.01); *G06K 9/6296* (2013.01); *G06K 9/66* (2013.01)

(58) Field of Classification Search
CPC ........... G06F 17/30864; G06F 17/30047; G06F 17/3005; G06F 17/30247; G06F 17/3025; G06K 9/46; G06K 9/6228

USPC .......................... 382/155, 159, 305
See application file for complete search history.

(56) References Cited

U.S. PATENT DOCUMENTS

| | | | |
|---|---|---|---|
| 8,515,212 B1 * | 8/2013 | Bengio et al. | 382/305 |
| 2004/0267740 A1 * | 12/2004 | Liu et al. | 707/3 |
| 2008/0097981 A1 | 4/2008 | Williams et al. | |

(Continued)

OTHER PUBLICATIONS

J. Jeon, V. Lavrenko, R. Manmatha, Automatic image annotation and retrieval using cross-media relevance models, Proceedings of the 26th annual international ACM SIGIR conference, Jul. 28-Aug. 1, 2003, Toronto, Canada.*

(Continued)

*Primary Examiner* — Kim Vu
*Assistant Examiner* — Michael Vanchy, Jr.
(74) *Attorney, Agent, or Firm* — Fish & Richardson P.C.

(57) ABSTRACT

Methods, systems and apparatus for refining image relevance models. In general, one aspect includes receiving a trained image relevance model that generates relevance measures of content feature values of images to a query, identifying a first threshold number of common content feature values for the set of training images, the common content feature values being identified as a set of content feature values that are each shared by at least a portion of the training images, identifying a subset of the set of training images having a quantity of the common content feature values greater than a second threshold number of content features values, and generating a re-trained image relevance model based on content feature values of the set of training images, wherein content feature values of the subset of training images are weighted higher than content feature values of the training images not in the subset.

18 Claims, 4 Drawing Sheets

(56) References Cited

U.S. PATENT DOCUMENTS

| | | | |
|---|---|---|---|
| 2009/0076800 A1* | 3/2009 | Li et al. .......................... | 704/10 |
| 2011/0106782 A1* | 5/2011 | Ke .................... | G06F 17/30256 |
| | | | 707/706 |
| 2012/0254076 A1* | 10/2012 | Yang et al. ..................... | 706/12 |
| 2012/0308121 A1* | 12/2012 | Datta .................. | G06F 17/3028 |
| | | | 382/155 |

OTHER PUBLICATIONS

Web image retrieval re-ranking with relevance model Wei-Hao Lin ; Rong Jin ; Hauptmann, A. Web Intelligence, 2003. WI 2003. Proceedings. IEEE/WIC International Conference on DOI: 10.1109/WI.2003.1241200 Publication Year: 2003 , pp. 242-248.*

* cited by examiner

REFINING IMAGE RELEVANCE MODELS

This application claims the benefit under 35 U.S.C. §119 (e) of U.S. provisional patent application 61/541,543, filed on Sep. 30, 2011, which is incorporated herein by reference in its entirety.

BACKGROUND

This specification relates to data processing and refining image relevance models.

An image search apparatus can use an image relevance model to evaluate relevance between textual user queries and images. For example, the relevance of an image to a user query can be determined, in part, based on textual content depicted in the image or textual content associated with the image, e.g., textual content appearing on a web page in association with the image. The relevance of an image to a query can also be determined by analyzing the way in which users who submit user queries interact with images responsive to the user queries. For example, an image search system may respond to a user query with one or more images, which are then displayed on a user device. If the user clicks on or otherwise interacts with one or more images, then this user interaction can be considered an indication that that those images were good (relevant) responses to the user query. If a particular image satisfies an image relevance threshold, e.g., a certain number of users click on the image when the image is presented as responsive to a user query, then the image may be labeled with a reference to the user query, e.g., a term included in the query, based on the determination that the user query accurately describes the image.

An image relevance model can be used to identify visual features of multiple images that have been identified as relevant to the same query. For example, multiple images that have been identified as relevant to the same query may have similar visual features, such as similar colors, brightness, shapes, edge locations, and/or other similar attributes. For example, images associated with the query "sunrise" will likely share similar colors (of a sky at sunrise) and shapes (of a sun appearing on the horizon). The attributes identified by the image relevance model can be used to further identify other images sharing the same common features—put another way, images characterized by the same common features—that may also be relevant to a query.

SUMMARY

In general, one aspect of the subject matter described in this specification can be implemented in methods that include receiving a trained image relevance model that generates relevance measures of content feature values of images to a query, the trained image relevance model trained based on content feature values of a set of training images, the query being a unique set of one or more query terms received by a search system as a query input, identifying a first threshold number of common content feature values for the set of training images, the common content feature values being identified as a set of content feature values that are each shared by at least a portion of the training images, identifying a subset of the set of training images having a quantity of the common content feature values greater than a second threshold number of content features values, and generating a re-trained image relevance model based on content feature values of the set of training images, wherein content feature values of the subset of training images are weighted higher than content feature values of the training images not in the subset. This and other implementations of this aspect include corresponding systems, apparatus, and computer program products.

Implementations of this aspect may include one or more of the following features. The aspect can include assigning a boost value to each image in the subset of the set of training images, the boost value based on a score received from a low-capacity image relevance model trained using the set of training images. Identifying a first threshold number of common content features for the set of training images can include training a low-capacity image relevance model based on content feature values of the images, the low-capacity image relevance model representing a fixed number of the common content feature values for the set of training images. Identifying a subset of the set of training images having a quantity of the common content feature values greater than a second threshold number of content features can include receiving a score for each image in the set of training images from the low-capacity image relevance model, and identifying images having a score greater than a score threshold as the subset of the set of training images. Content feature values of the subset of training images are weighted higher than content feature values of the training images not in the subset can include assigning a multiplier value to each image in the subset of training images, the multiplier value being greater than one. Generating a re-trained image relevance model based on content feature values of the set of training images can include generating the re-trained image relevance model based on the content feature values for the subset of training images and the assigned multiplier value Particular implementations of the subject matter described in this specification can be implemented so as to realize one or more of the following advantages. An image relevance model can be refined to better correlate text queries with images.

The details of one or more implementations are set forth in the accompanying drawings and the description below. Other features, aspects, and advantages of the invention will be apparent from the description and drawings, and from the claims.

DESCRIPTION OF DRAWINGS

Like reference symbols in the various drawings indicate like elements.

DETAILED DESCRIPTION

An image relevance model can be trained by an image search apparatus based on which images a user interacts with, e.g., clicks or hovers a pointer over or touches on a touchscreen, in response to a textual user query. The image search apparatus can also identify images that are "typical" images for a particular query, which can then be used to re-train the image relevance model by giving greater importance to the typical image in the training process. As used here, a typical image can be said to be an image which exemplifies the query. For example, a typical image for the query "Empire State Building" may be an image of the exterior of the Empire State Building. In contrast, an image that is not a typical image for the query may be an image of the lobby of the Empire State Building, which nonetheless is still relevant to the query and therefore still responsive. In order to determine which images are typical images for a query, the image search apparatus can identify which image features appear in images frequently clicked on when presented in response to a query. For example, images most frequently clicked on when presented in response to the query "Empire State Building" may all have a large amount of gray color, since the images relevant to that query are likely to show the building's gray exterior. Another example of a feature that may appear in these images is a large amount of blue color representing a clear sky behind the building, since images of this tall building are unlikely to show many other structures behind it.

Once the image search apparatus has identified the features that are most common among images relevant to a query, the image search apparatus can analyze the features that those images have in common. Then, the image search apparatus can identify which images have some or all of those features. In the example of the query "Empire State Building," the most typical images for this query may be those that exhibit both a large amount of gray color and a large amount of blue color, representing the building exterior and the sky behind the building, for example. Images that exhibit at least some or all of the features found among relevant images for the query can be designated as typical images and given special status when refining the image relevance model. For example, the typical images can be assigned a weight that indicates to the training system for the image relevance model that features of those images are most important to the query to which the images relate.

Figure 1:
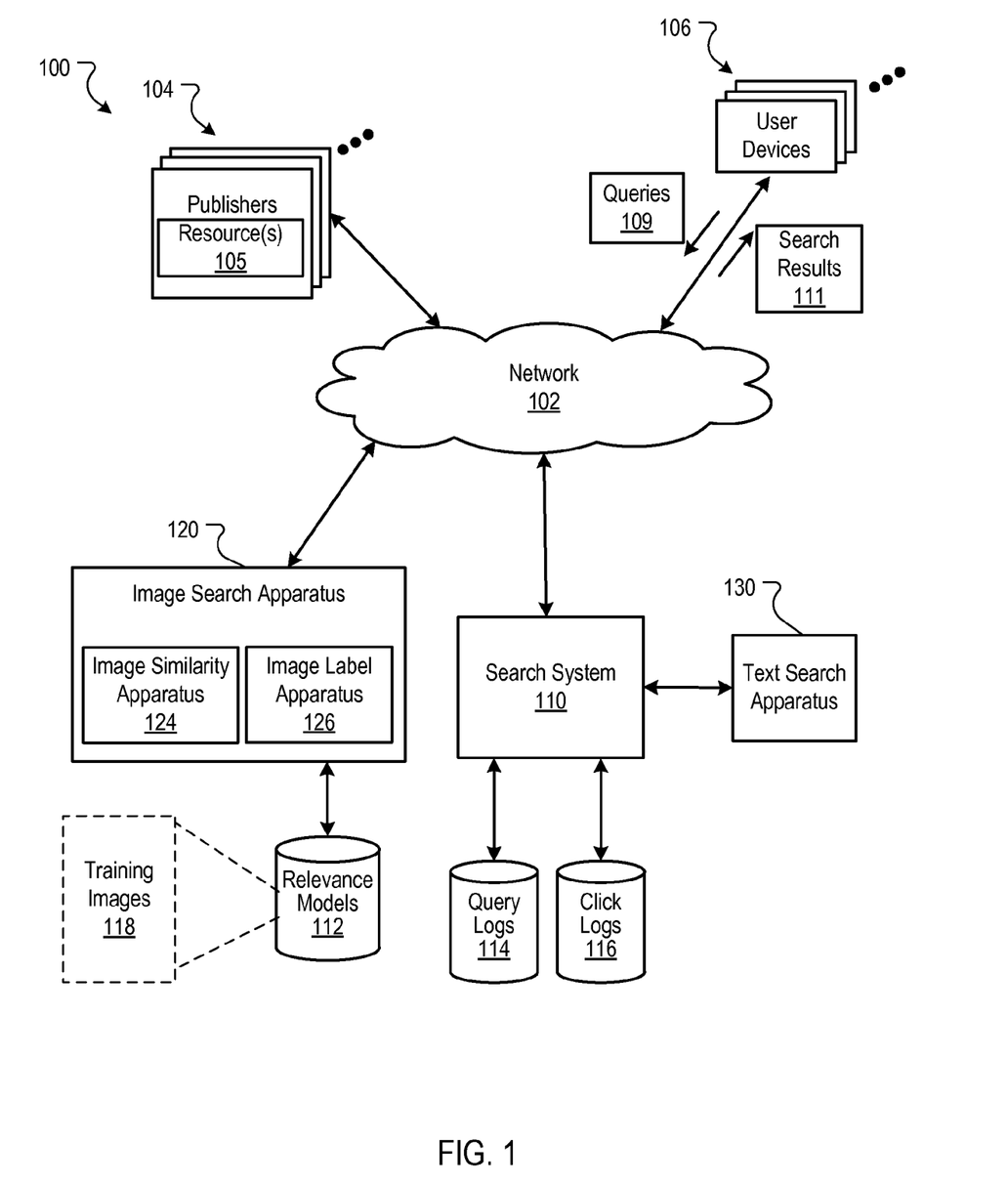
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, which connects web sites 104, user devices 106, and the search system 110. The environment 100 may include many web sites 104 and user devices 106, which are also sometimes referred to as client devices.

A web site 104 is a facility containing one or more resources associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources, the search system 110 identifies the resources by crawling and indexing the resources 105 provided by the web sites 104. Data about the resources can be indexed based on the resource to which the data corresponds.

The user devices 106 submit search queries 109 to the search system 110. In response, the search system 110 identifies resources that are responsive to, e.g., have at least a threshold relevance score for, the search query 109. The search system 110 generates search results 111 that identify the resources and returns the search results 111 to the user devices 106.

A search result 111 is data generated by the search system 110 that identifies a resource that is responsive to a particular search query, and includes a link to the resource. An example search result 111 can include a web page title, a snippet of text or a portion of an image extracted from the web page, and the URL of the web page. The search results 111 can be presented to a user of a user device 106. For example, the search queries 109 can be submitted during user sessions in which a user of a user device 106 enters search queries into a user interface and receives the search results 111 in response.

Search results 111 are ranked in part based on scores related to the resources identified by the search results, such as information retrieval ("IR") scores, and optionally a quality score of each resource relative to other resources. In some implementations, the IR scores are computed from dot products of a feature vector corresponding to a search query 109 and a feature vector corresponding to a resource, and the ranking of the search results is based on relevance scores that are a combination, e.g., sums, products, or other mathematical combinations, of the IR scores and quality scores. In some examples, the search results 111 can be ordered at least partially according to these relevance scores and provided to the user device for presentation according to the order.

The user devices 106 receive the search results, e.g., in the form of one or more web pages, and render the pages for presentation to users. In response to the user selecting a link in a search result at a user device 106, the user device 106 requests the resource identified by the link. The web site 104 hosting the resource receives the request for the resource 105 from the user device 106 and provides the resource to the requesting user device 106.

In some implementations, a search query 109 can include data for a single query type or for two or more query types, e.g., types of data in the query. For example, the search query 109 may have a text portion, and the search query may also have an image portion. A search query 109 that includes data for two or more query types can be referred to as a "hybrid query." In some examples, a search query 109 includes data for only one type of query. For example, the search query 109 may only include image query data, e.g., a query image, or the search query may only include textual query data, e.g., a text query.

In some implementations, the search system 110 includes an image search apparatus 120 that is used to process queries to identify images that are responsive to the search query 109, e.g., semantically related to the search query 109. For example, a search query 109 may include text with which the search system 110 can perform an image search, e.g., a search for images that are responsive to the text.

The term "semantic relatedness" as used here refers to the relatedness between text and images. A portion of text and an image are semantically related if the text describes a topic of an image or otherwise has a relationship with the content of the image. Generally, text is semantically related to an image if the text is similar to or relevant to a topic of the image. For example, the text "fish" is semantically related to an image of a mackerel. The degree to which text is semantically related can be quantified. For example, a confidence score may use used to indicate the degree to which text is accurately related to an image. The confidence score can be determined by an apparatus that determines relationships between text and attributes of images.

In some implementations, the search system 110 also includes a text search apparatus 130 that is used to perform a search based on a text query, e.g., text submitted by the user devices 106 as a portion of a query 109. The text search apparatus 130 can also perform a search based on a label for an image that was submitted by a user device 106 as a portion of a query 109, e.g., all or a proper subset of a query 109. For example, as described below, the label could be a label associated with the image by an image label apparatus 126. In some examples, the label is indexed according to and/or stored with a reference to the image.

An image label ("label") is data that is indicative of subject matter to which an image is relevant. Labels can be explicitly specified by a publisher of a web site 104 on which the image appears. Labels can also be generated, for example, based on text that appears near the image on the web page. For example, a label can be generated for an image based on text that is located adjacent to, e.g., within a threshold number of pixels of, the image or in a portion of a document that is identified as containing information relevant to the image, e.g., a frame in which the image is presented. A label can also be generated based on text that is included in the image, e.g., visually depicted in the image, or otherwise associated with the image, e.g., text included in a file name, text included in anchor text of a link to the image, or resource location of the image. The image label apparatus 126 can generate labels for images.

The queries submitted during the user sessions can be stored in query logs 114. Selection data defining actions taken responsive to search results provided for the user sessions can be stored in click logs 116. These actions can include whether a search result was selected, e.g., whether a user interacted with the search result. The query logs 114 and click logs 116 can be used to map queries submitted during user sessions to resources that were identified in search results and the actions taken by users. If time data are also stored, then the relative times at which those actions were taken can also be determined. The click logs and query logs can be used to map queries submitted during user sessions to resources that were identified in response to the queries and that were selected by the users of the user devices 106. In some implementations, the data stored in the query logs 114 and click logs 116 can be anonymized.

In some implementations, query data and image selection data, e.g., click data, are stored in the query logs 114 and click logs 116 for each unique query submitted by users. The query data are data that define queries of one or more words that were received, for example, as search queries 109. For example, if the queries "dolphin", "exhibits", and "dolphin exhibits" are each received by the search system 110, then query data and click data are stored in the query logs 114 and click logs 116 for each of the queries "dolphin", "exhibits", and "dolphin exhibits".

In some examples, the query logs 114 and click logs 116 can be used to generate image relevance models 112. Because the image search apparatus 120 processes each search query as a whole, it can create a corresponding image relevance model 112 for each query. When selecting images for reference in image search results responsive to a particular query, the image search apparatus 120 calculates the relevance measures based on an image relevance model 112 that is associated with that particular query.

The image search apparatus 120 identifies images as being relevant to a query based on a relevance measure between the image and the query. The relevant images can be used as training images 118 for an image relevance model 112. In some implementations, the relevance measure is based on a relevance feedback score. The relevance feedback score is a relevance measure that is generated based on user actions in response to an image appearing in search results. For example, click data specifying a number of times an image was selected from search results for a query can represent a measure of the relevance of the image to the query. Thus, the image search apparatus 120 can derive the relevance measure, based at least in part on, the click logs 116 and query logs 114, e.g., based on numbers of times that images were presented in response to particular queries and numbers of times that users interacted with the images when presented.

Before the image relevance models 112 are used, they are generally trained by the image search apparatus 120. At a high level, the image search apparatus 120 can train an image relevance model 112 for each query by first selecting training images 118 that are relevant to that query. In some implementations, content feature values, i.e., values indicative of visual features of the image and/or other image features, for each training image are extracted and are transformed into a sparse representation using a pre-computed dictionary of visual terms that represent a set of regions having similar content feature values. The extraction and transformation yields a "bag of features" for the image. Generally, the content feature values of an image quantitatively represent visual features of the image.

Thereafter, an image relevance model 112 for each query is learned. The image relevance model 112 can be of the form that generates a score for an image based on the sparse representation of the image, e.g., $$IRS = W*X$$

where IRS is an image relevance score, X is a vector of feature values representing an image, and W is a vector of parameters, e.g., feature weights, learned for the model. In some implementations, the vector of feature values is a sparse vector of feature values representing an input image. In some implementations, the vector of feature values representing an input image is stored in a compressed form called an image content descriptor. The feature values can be determined by decompressing the image content descriptor into a vector of feature values.

The technique described here only represents some implementations for determining content feature values. Other implementations can use other techniques to determine content feature values. For example, some implementations can use a non-linear model for associating content feature values and feature weights.

Each image relevance model 112 is trained to determine the relevance of an image to a query, e.g., one of the queries 109, based on content feature values of images for which a relevance feedback score is available. In turn, the image relevance model can be applied to content feature values of other images to determine a relevance score for the other images relative to the query. For example, the content feature values can be input to the image relevance model, which can compute and output the relevance score.

The image search apparatus 120 applies an independent image relevance model 112 to content feature values of the images for each unique query that is identified by the image search apparatus 120, e.g., each unique set of terms submitted as a query identified by the image search apparatus 120. Using a separate image relevance model 112 for each query rather than using an image relevance model for each constituent term in the query reduces the overhead associated with identifying search results for a query. For example, the image relevance models 112 for the queries can be trained independently and in parallel, as they are not required to consider the output of other image relevance models 112 for other queries. Additionally, only one image relevance model 112 need be processed for each query, which reduces resources when selecting images to reference in image search results for a query.

When the image relevance model 112 receives an image as input, the image relevance model 112 can output a relevance score indicating the degree to which the input image is related to the query represented by the image relevance model 112. The reliability of the relevance score as an indication of image relevance to a particular query is generally dependent on the accuracy of relevance feedback as a relevance indicator.

The image search apparatus 120 includes an image similarity apparatus 124 and an image label apparatus 126. The image similarity apparatus 124 generates data indicative of the visual similarity of images to a query image. The image label apparatus 126 generates labels, e.g., textual data, indicative of a topic or subject matter to which a query image is related, or are otherwise semantically related to a query image.

The description that follows describes the image similarity apparatus 124, image label apparatus 126, as well as processes that can be implemented by these and other apparatus. These apparatus and related processes are described with reference to a search query that includes search queries 109 and search results 111 that have been identified as responsive to the search query. However, each respective apparatus and process can be implemented with different processing systems and for different operational environments.

The image similarity apparatus 124 includes one or more processors configured to identify images that are near duplicate images to an image received by the image similarity apparatus 124 as input. In some implementations, near duplicate images are images that are identical except for differences in the way the images have been processed. In general, the differences between two near duplicate images are differences other than differences in visual features of the images. As one example, two identical images at different resolutions are near duplicate images. As another example, two images of the same object having different brightness, contrast, or other image attributes, e.g., image attributes adjusted in image processing software, can be near duplicate images. As another example, an uncropped version of an image and a cropped version of the same image, e.g., cropped to remove a border in the image, can be near duplicate images. Images can be identified as near duplicate images if they satisfy a similarity threshold, e.g., a similar score determined by the image similarity apparatus 124 that exceeds a similarity threshold.

The image label apparatus 126 can receive an image as input and the image label apparatus 126 can return one or more labels that describe a topic of or are otherwise semantically related to the image. In some examples, the image label apparatus 126 can identify a label that is semantically related to an image because the image label apparatus 126 already stores data indicating which labels are semantically related to the image. In some examples, the image label apparatus 126 can consult an image relevance model 112 to identify a label based on visual features of the image. For example, the image label apparatus 126 can provide the image to an image relevance model 112 for a particular query to determine the degree to which the image is relevant to the query. The query can then be used as a label for the image if the image is sufficiently relevant to the query. In some examples, the degree to which the image is relevant to the query is represented as a confidence score. For example, an image may be sufficiently relevant to the query if the image has a confidence score as determined according to the image relevance model 112 that exceeds a confidence score threshold.

Image labels can also be used to identify images that are responsive to a query. For example, the image relevance model 112 for the query can indicate which images are most relevant to the query. However, misdescriptive labels, e.g., labels that do not accurately describe an image, can result in unrelated images being improperly identified as responsive to a search query. For example, if an image of a baseball and an image of an egg are each associated with a common label (e.g., "egg") then these images may both appear in search results responsive to a query image of an egg even though the label "egg" is unrelated to the image of the baseball.

Because the image label apparatus 126 may associate labels with images based on user interaction with images responsive to search queries, misdescriptive labels may be associated with images based on user interaction with an image. For example, click data may indicate that an image is frequently clicked (or otherwise selected) in response to a search query. While click data usually implies that the image is relevant to the search query, the image may have been clicked by users for reasons unrelated to its relevance to the search query. For example, the image may be humorous, catching the attention of the user who clicked or selected the image, or the image may concern another unrelated interest of the user. As described above, image relevance models 112 can be trained based on information describing user interaction with images and content feature values for those images. The image relevance models 112 can be further refined based on information other than information about user interaction with images, as described below.

Figure 2:
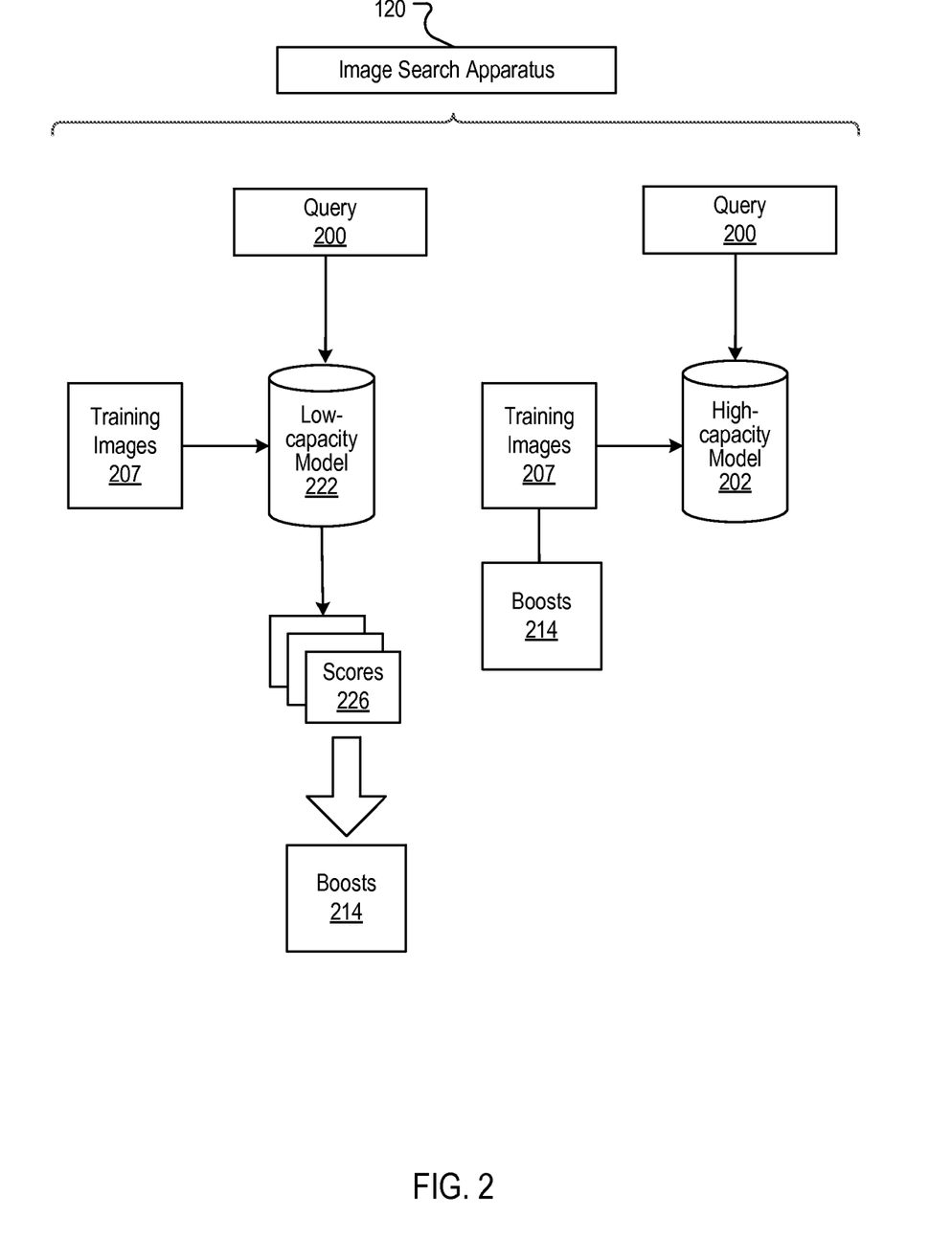
FIG. 2 is a block diagram illustrating image relevance model refinement.

FIG. 2 is a block diagram illustrating image relevance model 202 refinement. In some examples, the image search apparatus 120 can re-train an image relevance model for a particular query 200 by identifying canonical images, sometimes called typical images, i.e., images that have the most typical features among the set of training images 207 that was used to train the image relevance model 202. In some examples, the image relevance model has not yet been trained, and the training images 207 are selected to train the image relevance model for the first time.

In some implementations, the image search apparatus 120 generates an image relevance model called a low-capacity model 222. The low-capacity model 222 can receive a set of images and scores the images based on how typical each image is relative to the other images in the set. The low-capacity model 222 functions differently from a high-capacity model such as the image relevance models 112 shown in FIG. 1 in the way each model evaluates visual features. Unlike a high-capacity model 202, which is specific to a particular search query 200, a low-capacity model 222 is a general model not specific to any particular search query.

In some implementations, the low-capacity model 222 transforms an image into a multi-dimensional representation. For example, each dimension can be a type of visual feature such as brightness, contrast, color, or other types of visual features. Thus, each image can be placed at coordinates within the multi-dimensional space based on the content feature values of the image. Further, a search query can be placed at coordinates within the multi-dimensional space based on the content feature values of images identified as relevant to the search query. The capacity of the low-capacity model 222 is determined by the number of dimensions that the low-capacity model 222 supports. For example, the low-capacity model 222 may support a fixed number of dimensions such as ten or fifty or two hundred. The number of dimensions of the low-capacity model 222 can be chosen based on a threshold number of visual features to be represented within the low-capacity model 222. The visual features that appear most frequently in the images used to train the low-capacity model 222, i.e., the most common visual features characterizing the training images, are chosen to be represented as dimensions in the low-capacity model 222. In this way, the amount of information that the low-capacity model 222 stores about each image is limited by the number of dimensions supported by the low-capacity model 222. Further, because each search query is placed in the multi-dimensional space in proximity to the content feature values of images relevant to the search query, the search query will be placed in proximity to the content feature values that occur most frequently among the images relevant to the search query. Each content feature value represented by the low-capacity model 222 will be shared by a portion of the training images. The portion of the training images characterized by a content feature value depends on the frequency of the content feature value among the training images.

The low-capacity model 222 can take other forms than the one described here. For example, the low-capacity model 222 may transform images into multi-dimensional representations in which each dimension simultaneously represents multiple visual features. One way to do this is place the content feature values of an image into a vector having D dimensions, in which each dimension represents a type of visual feature. A linear transformation can be applied to the vector to generate a matrix of size D by d. The matrix can then be transformed into a vector of d dimensions, each dimension representing a combination of visual features. The dimensions can then be used in the low-capacity model 222. Other techniques for transforming images into multi-dimensional representations can be used.

A low-capacity model 222 can be used to refine a set of training images 207 used to train a high-capacity model 202. The high-capacity model 202 may be, for example, an image relevance model associated with a particular query 200. The high-capacity model 202 may be an example of one of the image relevance models 112 shown in FIG. 1. The training images 207 are refined by assigning boost values 214 to some or all of the training images 207 when they are used to train or re-train the high-capacity model 202. The boost values 214 are described in further detail below.

The low-capacity model 222 evaluates the visual features of the training images 207 by determining which visual features are most typical for the training images 207 for a particular search query 200. In some implementations, the low-capacity model places the training images 207 within a multi-dimensional space in which each dimension represents a type of visual feature. The low-capacity model 222 can also place the search query 200 within the multi-dimensional space based on the content feature values of the training images 207. For example, if the color grey appears in more training images 207 than any other color, then the low-capacity model 202 may identify content feature values corresponding to the color grey as typical for the set of training images 207 because the search query 200 is placed in the multi-dimensional space at coordinates representing the color grey. As another example, if a majority of the training images are characterized by sharp contrast between the left side of the image and the right side of the image, then the low-capacity model 202 may identify content feature values corresponding to the sharp contrast as typical for the set of training images 207 because the search query 200 is placed in the multi-dimensional space at coordinates representing the sharp contrast.

The low-capacity model 222 outputs a set of scores 226 such that each image in the set of training images 207 has a corresponding score in the set of scores 226. Each score indicates the degree to which the corresponding image is characterized by visual features determined to be typical for the input images, for example, the set of training images 207. In some implementations, the scores 226 are numeric scores. For example, the scores 226 may be calculated on a scale such as a scale from zero to one hundred. In this example, an image having a score of ninety is an image that is characterized by many visual features determined to be typical for the set of training images 207. Further, in this example, an image having a score of ten is an image that is characterized by few visual features determined to be typical for the set of training images 207.

Other techniques for scoring the training images 207 can be used. For example, techniques can be used that do not use a low-capacity image relevance model. In some implementations, the image search apparatus 120 can analyze the content feature values of each of the training images 207 to determine which content feature values occur most often among the training images 207. For example, the image search apparatus 120 can identify which content feature values occur in a percentage of training images 207 greater than a threshold percentage. These identified content feature values can be said to be "typical" content feature values for the training images 207. The image search apparatus 120 can then assign a score to each of the training images 207 based on the number of "typical" content feature values in the training image.

The scores 226 can be converted to boost values 214 which are then associated with the training images 207. In some examples, a score associated with a particular training image 207 is converted to a boost value and associated with the same training image 207. The score can be converted to a boost value using a mathematical formula. For example, each score may be multiplied or divided by a constant value to generate the corresponding boost value. In some examples, a score is used as a boost value absent any mathematical formula applied to the score.

In some implementations, each image in the set of training images 207 is assigned a boost value. In some implementations, some but not all of the images in the set of training images 207 are assigned a boost value. In some examples, only images having a score 226 above a threshold value may be assigned a boost value. For example, if the scores 226 have values between zero and one hundred then only those images having a score greater than fifty may be assigned a boost value. Put another way, images having a score greater than fifty have greater than a threshold number of "typical"

visual features for the set of training images 207, because the score represents the number of "typical" visual features characterizing the image.

Once the boost values 214 are associated with the training images 207, the training images 207 can be used by the image search apparatus 120 to train or re-train the high-capacity model 202. In some examples, the high-capacity model 202 can be trained in a similar manner as described for the image relevance models 112 in FIG. 1. For example, the high-capacity model 202 may be trained by extracting content feature values from the training images 207 to determine which content feature values are relevant to the search query 200 corresponding to the high-capacity model 202.

When the content feature values of a particular image among the training images 207 are evaluated, a boost value 214 associated with the image can provide weight to the relevance of the content feature values. For example, if a first image in the set of training images 207 has a higher boost value 214 than a second image in the set of training images 207, then the content feature values of the first image may be categorized as more relevant to the query 200 than content feature values of the second image. In this way, content feature values of images that have been determined to be typical of the entire set of training images 207 are categorized as more relevant to the search query 200 than they would absent the boost values 214. In use, the high-capacity model 202 will identify other images having some or all of those content feature values as highly relevant to the search query 200.

Figure 3:
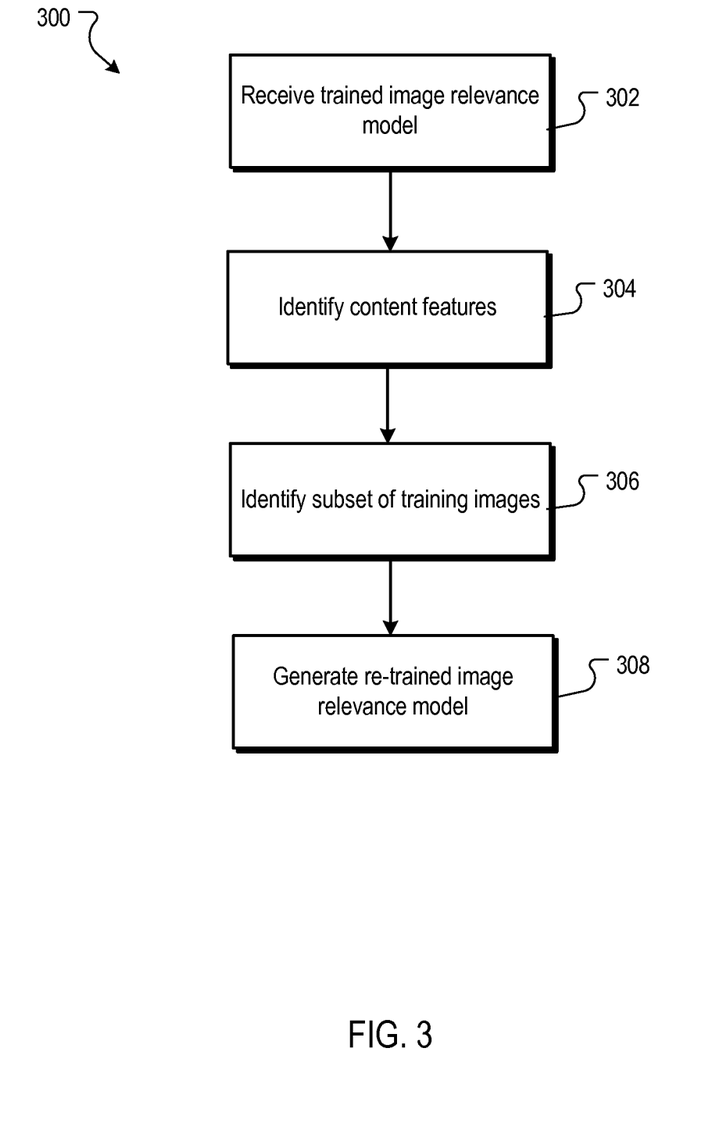
FIG. 3 is a flowchart of an example process for refining an image relevance model.

FIG. 3 is a flowchart of an example process 300 for refining an image relevance model. The operations of the process 300 can be performed, for example, by an image search apparatus 120.

At operation 302, a trained image relevance model, e.g. one of the trained image relevance models 112 shown in FIG. 1, is received. The image relevance model may have been trained by a set of training images identified as relevant to a particular query. In particular, the image relevance model may have been trained based on content feature values of the set of training images, and each of the queries is a unique set of one or more query terms received by the image search apparatus as a query input.

At operation 304, a first threshold number of common content feature values present in a set of training images is identified. In some examples, the threshold number of content feature values may be less than the total number of content feature values represented by (characterizing) the training images. Each content feature value is shared by a portion of the training images. In some implementations, the threshold number of content feature values is identified by training a second image relevance model based on content feature values of the images. For example, the second image relevance model could be the low-capacity model 222 shown in FIG. 2. Because the low-capacity model may be limited to a certain number of dimensions, in which each dimension represents a type of visual feature of an image, the low-capacity model only stores information about a limited number of content feature values of the images. The limited number of content feature values can be said to be the most common or most "typical" content features of images of the set of training images.

At operation 306, a subset of the set of training images is identified. The images in the subset have a quantity of the identified content feature values greater than a second threshold number of content feature values. Thus, the images in the subset have at least a threshold number of content feature values identified as "typical" content feature values. In some implementations, the subset can be identified by receiving a score for each image in the set of training images from the second image relevance model, and identifying images having a score greater than a threshold as the subset of the set of training images.

At operation 308, a re-trained image relevance model is generated based on content feature values of the set of training images. The content feature values of the subset of training images are weighted higher than content feature values of the training images not in the subset. In some implementations, each image in the subset of training images is assigned a multiplier value, and the multiplier value may be based on scores determined for each of the images in the subset of training images. The re-trained image relevance model can be generated based on the subset of training images and the assigned multiplier value.

Figure 4:
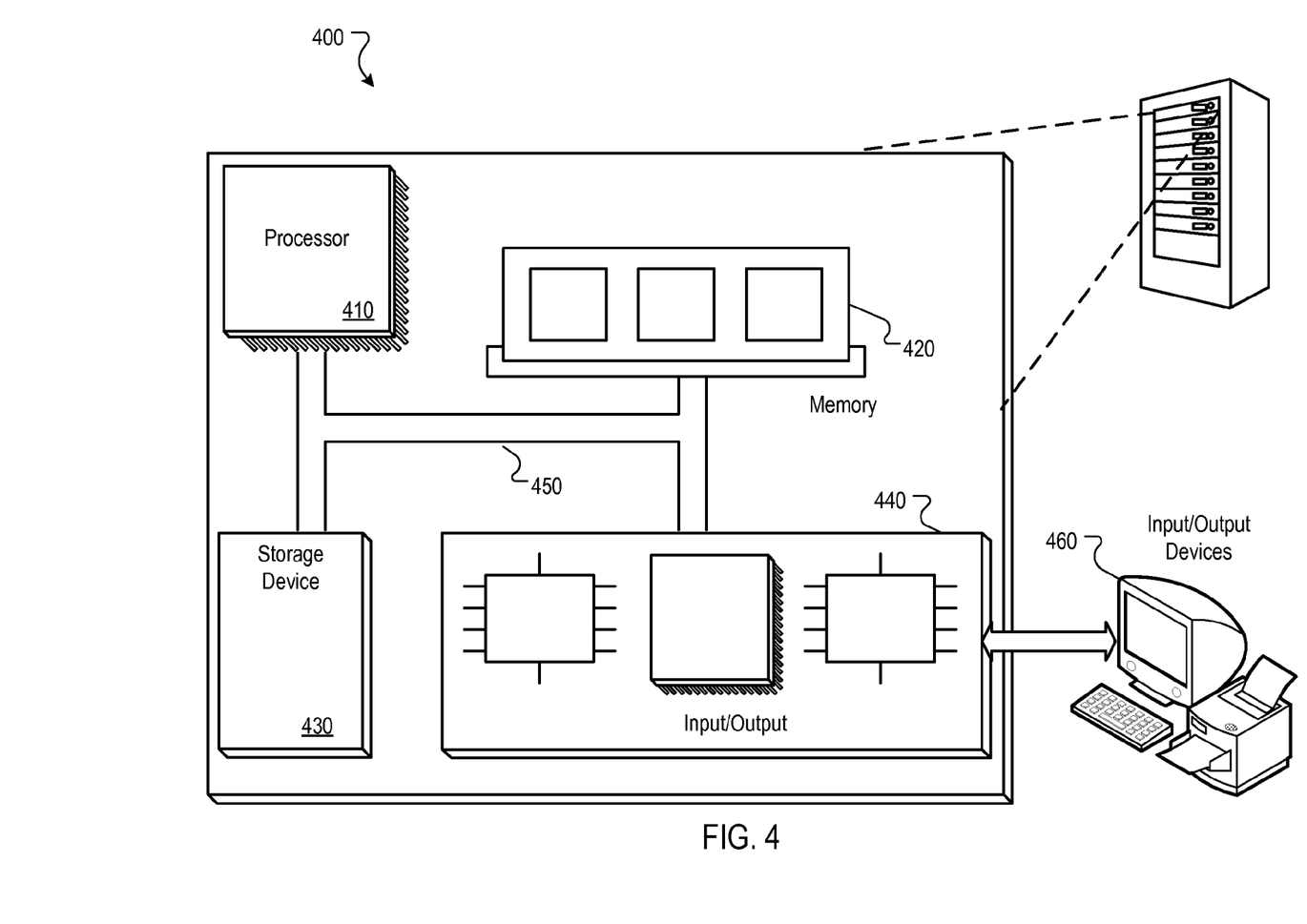
FIG. 4 is a block diagram of an example computer system.

FIG. 4 is a block diagram of an example computer system 400. For example, the system 400 could be a system or a portion of a system executing the search system 110 shown in FIG. 1. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
  identifying a set of training images previously used to train an image relevance model that generates relevance measures of images to a query based on content feature values of the images, the query being a unique set of one or more query terms; identifying typical visual features for the set of training images, including:
  for two or more visual features:
  determining that at least a given portion of the training images from the set of training images that were used to train the image relevance model each include the visual features, and
  in response to determining that at least a given portion of the training images each include the visual features, identifying the visual features as typical visual features for the set of training images;
  identifying, as a subset of training images from the set of training images, training images having at least a threshold portion of the identified typical visual features, wherein the subset does not include all images within the set of training images;
  assigning, to each training image in the subset of the training images, a weight that increases in proportion to the number of the identified typical visual features that the training image has, wherein each training image in the subset has a higher weight than weights assigned to other images from the set of training images that are not in the subset of training images; and
  generating a re-trained image relevance model based on visual features of the set of training images and the weights assigned to the training images in the subset of training images that have at least the threshold portion of the identified typical visual features.

2. The method of claim 1, further comprising assigning a boost value to each image in the subset of the set of training images, the boost value based on a score received from a low-capacity image relevance model trained using the set of training images.

3. The method of claim 1, further comprising:
  training a low-capacity image relevance model based on visual features of the images, the low-capacity image relevance model representing a fixed number of the visual features for the set of training images.

4. The method of claim 3, wherein identifying, as a subset of the set of training images, training images having at least a threshold portion of the identified typical visual features comprises:
  receiving a score for each image in the set of training images from the low-capacity image relevance model, and identifying images having a score greater than a score threshold as included in the subset of the set of training images.

5. The method of claim 1, further comprising assigning a multiplier value to each image in the subset of training images, the multiplier value being greater than one.

6. The method of claim 5, wherein generating a re-trained image relevance model comprises generating the re-trained image relevance model based on the visual features for the subset of training images and the assigned multiplier value.

7. A system, comprising:
  a data processing apparatus; and
  a memory coupled to the data processing apparatus having instructions stored thereon which, when executed by the data processing apparatus cause the data processing apparatus to perform operations comprising:
  identifying a set of training images previously used to train an image relevance model that generates relevance measures of images to a query based on content feature values of the images, the query being a unique set of one or more query terms;
  identifying typical visual features for the set of training images, including:
  for two or more visual features:
  determining that at least a given portion of the training images from the set of training images that were used to train the image relevance model each include the visual features, and
  in response to determining that at least a given portion of the training images each include the visual features, identifying the visual features as typical visual features for the set of training images;
  identifying, as a subset of training images from the set of training images, training images having at least a threshold portion of the identified typical visual features, wherein the subset does not include all images within the set of training images;
  assigning, to each training image in the subset of the training images, a weight that increases in proportion to the number of the identified typical visual features that the training image has, wherein each training image in the subset has a higher weight than weights assigned to other images from the set of training images that are not in the subset of training images; and generating a re-trained image relevance model based on visual features of the set of training images and the weights assigned to the training images in the subset of training images that have at least the threshold portion of the identified typical visual features.

8. The system of claim 7, the operations further comprising assigning a boost value to each image in the subset of the set of training images, the boost value based on a score received from a low-capacity image relevance model trained using the set of training images.

9. The system of claim 7, the operations further comprising:
training a low-capacity image relevance model based on visual features of the images, the low-capacity image relevance model representing a fixed number of the visual features for the set of training images.

10. The system of claim 9, wherein identifying, as a subset of the set of training images, training images having at least a threshold portion of the identified typical visual features comprises:
receiving a score for each image in the set of training images from the low-capacity image relevance model, and identifying images having a score greater than a score threshold as included in the subset of the set of training images.

11. The system of claim 7, the operations further comprising assigning a multiplier value to each image in the subset of training images, the multiplier value being greater than one.

12. The system of claim 11, wherein generating a re-trained image relevance model comprises generating the re-trained image relevance model based on the visual features for the subset of training images and the assigned multiplier value.

13. Non-transitory computer readable media storing software comprising instructions executable by a processing device and upon such execution cause the processing device to perform operations comprising:
identifying a set of training images previously used to train an image relevance model that generates relevance measures of images to a query based on content feature values of the images, the query being a unique set of one or more query terms;
identifying typical visual features for the set of training images, including:
for two or more visual features:
determining that at least a given portion of the training images from the set of training images that were used to train the image relevance model each include the visual features, and
in response to determining that at least a given portion of the training images each include the visual features, identifying the visual features as typical visual features for the set of training images;
identifying, as a subset of training images from the set of training images, training images having at least a threshold portion of the identified typical visual features, wherein the subset does not include all images within the set of training images;
assigning, to each training image in the subset of the training images, a weight that increases in proportion to the number of the identified typical visual features that the training image has, wherein each training image in the subset has a higher weight than weights assigned to other images from the set of training images that are not in the subset of training images; and
generating a re-trained image relevance model based on visual features of the set of training images and the weights assigned to the training images in the subset of training images that have at least the threshold portion of the identified typical visual features.

14. The non-transitory computer readable media of claim 13, the operations further comprising assigning a boost value to each image in the subset of the set of training images, the boost value based on a score received from a low-capacity image relevance model trained using the set of training images.

15. The non transitory computer readable media of claim 13, the operations further comprising: training a low-capacity image relevance model based on visual features of the images, the low-capacity image relevance model representing a fixed number of the visual features for the set of training images.

16. The non-transitory computer readable media of claim 15, wherein identifying, as a subset of the set of training images, training images having at least a threshold portion of the identified typical visual features comprises: receiving a score for each image in the set of training images from the low-capacity image relevance model, and identifying images having a score greater than a score threshold as the subset of the set of training images.

17. The non-transitory computer readable media of claim 13, the operations further comprising assigning a multiplier value to each image in the subset of training images, the multiplier value being greater than one.

18. The non-transitory computer readable media of claim 17, wherein generating a re-trained image relevance model comprises generating the re-trained image relevance model based on the visual features for the subset of training images and the assigned multiplier value.

* * * * *